(12) United States Patent
Yasuda et al.

(10) Patent No.: US 11,767,021 B2
(45) Date of Patent: Sep. 26, 2023

(54) SYSTEMS AND METHODS FOR REMOTELY ASSISTING AN OPERATOR

(71) Applicant: Toyota Research Institute, Inc., Los Altos, CA (US)

(72) Inventors: Hiroshi Yasuda, San Francisco, CA (US); Manuel Ludwig Kuehner, Mountain View, CA (US)

(73) Assignee: Toyota Research Institute, Inc., Los Altos, CA (US)

(*) Notice: Subject to any disclaimer, the term of this patent is extended or adjusted under 35 U.S.C. 154(b) by 21 days.

(21) Appl. No.: 17/475,980

(22) Filed: Sep. 15, 2021

(65) Prior Publication Data

US 2023/0082838 A1 Mar. 16, 2023

(51) Int. Cl.
| | |
|---|---|
| *G08G 1/16* | (2006.01) |
| *B60W 50/14* | (2020.01) |
| *B60W 40/08* | (2012.01) |
| *G08B 21/06* | (2006.01) |

(52) U.S. Cl.
CPC ............ *B60W 50/14* (2013.01); *B60W 40/08* (2013.01); *G08B 21/06* (2013.01); *G08G 1/163* (2013.01); *B60W 2040/0827* (2013.01); *B60W 2050/143* (2013.01); *B60W 2540/229* (2020.02)

(58) Field of Classification Search
CPC ........ B60W 50/14; B60W 40/08; G08B 21/06; G08G 1/163; B60W 2040/0827; B60W 2050/143; B60W 2540/229
See application file for complete search history.

(56) References Cited

U.S. PATENT DOCUMENTS

| | | | | |
|---|---|---|---|---|
| 2006/0220915 | A1* | 10/2006 | Bauer | G08B 21/06 340/576 |
| 2012/0326967 | A1* | 12/2012 | Gohng et al. | B60W 50/14 345/156 |
| 2017/0293299 | A1* | 10/2017 | Matsushita et al. | B60W 50/12 |
| 2018/0081371 | A1* | 3/2018 | Bar-Tal et al. | G05D 1/0248 |
| 2019/0392235 | A1 | 12/2019 | Shimizu et al. | |

(Continued)

FOREIGN PATENT DOCUMENTS

| | | |
|---|---|---|
| CN | 112216066 A | 1/2021 |
| WO | 2021118675 A1 | 6/2021 |

OTHER PUBLICATIONS

Lucas Mearian, "Feds want cars to talk to each other to avoid crashes," Computerworld, Dec. 15, 2016, 5 pages.

(Continued)

*Primary Examiner* — Ryan W Sherwin
(74) *Attorney, Agent, or Firm* — Christopher G. Darrow; Darrow Mustafa PC (57) ABSTRACT

System, methods, and other embodiments described herein relate to remotely assisting an operator that is impaired using alerts from a vehicle. In one embodiment, a method includes receiving, by a first vehicle using a communications network, assistance information about an operator and a second vehicle near the first vehicle, wherein the assistance information indicates a state of the operator and a position of the second vehicle. The method also includes, upon approving an action according to the state and the position, selecting an alert that changes the state according to the position and attributes determined according to sensor data of the first vehicle. The method also includes activating the alert by the first vehicle.

20 Claims, 4 Drawing Sheets

(56) References Cited

U.S. PATENT DOCUMENTS

| 2020/0039508 | A1* | 2/2020 | Onishi | B60W 50/14 |
| 2020/0250982 | A1 | 8/2020 | Kim et al. | |
| 2020/0398750 | A1* | 12/2020 | Aizawa et al. | B62J 50/22 |
| 2021/0107476 | A1* | 4/2021 | Cui | B60W 60/00276 |
| 2021/0291832 | A1* | 9/2021 | Simmons et al. | B60W 10/20 |
| 2022/0111867 | A1* | 4/2022 | Trask et al. | B60W 50/14 |

OTHER PUBLICATIONS

Knipling et al., "Vehicle-Based Drowsy Driver Detection: Current Status and Future Prospects," IVHS America Fourth Annual Meeting, Atlanta, GA, Apr. 1994, 23 pages.

Shetty et al., "Safety Challenges for Autonomous Vehicles in the Absence of Connectivity," Transportation Research Part C: Emerging Technologies, vol. 128, Apr. 14, 2021, pp. 1-25.

* cited by examiner

SYSTEMS AND METHODS FOR REMOTELY ASSISTING AN OPERATOR

TECHNICAL FIELD

The subject matter described herein relates, in general, to assisting an operator of a vehicle, and, more particularly, to remotely assisting an operator that is impaired using alerts from a vehicle.

BACKGROUND

Assistance systems in a vehicle can notify an operator of dangerous conditions. For example, assistance systems detect when an operator becomes drowsy or the vehicle departs from a lane. A driver monitoring system (DMS) detects these conditions and others using data from sensors (e.g., steering sensor, camera, etc.). In response, the system can sound an alarm, thereby bringing awareness to the dangerous conditions. In this way, the assistance systems increase safety for the operator and surrounding traffic.

However, some operators ignore or fail to correct dangerous conditions detected by the DMS. For instance, a drowsy operator may continue driving without regard to an alarm because loud music diminishes the effects of the alarm. The drowsy operator may also misunderstand the alarm because the DMS does not indicate a degree of drowsiness. Accordingly, an operator fails to take appropriate action when the DMS detects dangerous conditions.

SUMMARY

In one embodiment, example systems and methods relate to remotely assisting an operator that is impaired using alerts from a vehicle. In various implementations, driver monitoring systems (DMS) encounter difficulties helping an operator take corrective action during a dangerous condition. For example, when the operator ignores an alert from the DMS of detected drowsiness, the vehicle can drift dangerously. Therefore, in one embodiment, an assistance system receives information from a requesting vehicle to assist an operator. The assistance system operates in a separate vehicle that is near the requesting vehicle and uses an operator state and a requesting vehicle position within the information. The assistance system determines whether to take action and alert the operator using the information, such as according to distance or speed. An alert from a separate vehicle is effective since operators are likely to react to external events (e.g., honking, flashing lights, etc.) more than vehicle warnings locally. Thus, upon request the assistance system can improve the operator state remotely by flashing lights according to the distance.

In one approach, the assistance system selects an alert if action is approved by the assisting vehicle. The alert may be flashing lights or honking a horn depending on the requesting vehicle position and attributes according to an environmental condition. For example, the assistance system flashes headlights when within the viewing angle of the operator during nighttime. As another approach, the assistance system honks the horn instead of flashing lights when behind the requesting vehicle to increase the likelihood of changing the operator state. Accordingly, the assistance system uses the information to remotely change the operator state, thereby improving traffic safety and functioning of a DMS.

In one embodiment, an assistance system for remotely assisting an operator that is impaired using alerts from a vehicle is disclosed. The assistances system includes a processor and a memory storing instructions that, when executed by the processor, cause the processor to receive, by a first vehicle using a communications network, assistance information about the operator and a second vehicle near the first vehicle, wherein the assistance information indicates a state of the operator and a position of the second vehicle. The instructions also include instructions to, upon approving action according to the state and the position, select an alert that changes the state according to the position and attributes determined according to sensor data of the first vehicle. The instructions also include instructions to activate the alert by the first vehicle.

In one embodiment, a non-transitory computer-readable medium for remotely assisting an operator that is impaired using alerts from a vehicle and including instructions that when executed by a processor cause the processor to perform one or more functions is disclosed. The instructions include instructions to receive, by a first vehicle using a communications network, assistance information about the operator and a second vehicle near the first vehicle, wherein the assistance information indicates a state of the operator and a position of the second vehicle. The instructions also include instructions to, upon approving action according to the state and the position, select an alert that changes the state according to the position and attributes determined according to sensor data of the first vehicle. The instructions also include instructions to activate the alert by the first vehicle.

In one embodimnt, a method of remtely assisting an operator that is impaired using alerts from a vehicle is disclosed. In one embodiment, the method includes receiving, by a first vehicle using a communications network, assistance information about an operator and a second vehicle near the first vehicle, wherein the assistance information indicates a state of the operator and a position of the second vehicle. The method also includes, upon approving an action according to the state and the position, selecting an alert that changes the state according to the position and attributes determined according to sensor data of the first vehicle. The method also includes activating the alert by the first vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments relating to remotely assisting an operator that is impaired using alerts from a vehicle are disclosed herein. An operator can ignore an alert from a driver monitoring system (DMS) indicating a precarious state, such as drowsy. As such, the accident risk of the vehicle increases without corrective action by the operator during dangerous conditions. Therefore, in one embodiment, an assistance system in a vehicle receives assistance information from a requesting vehicle indicating an operator state and specifying an alert (e.g., flashing lights, honking horn, etc.). The assistance system determines whether to take action, such as by assessing environmental conditions (e.g., light levels, noise levels, etc.) or relative position. The assessment includes a determination that acting will improve the operator state from a precarious or dangerous level. For example, the assistance system approves taking action if a relative angle between the vehicles is within a range (e.g., less than 90 degrees), the assisting vehicle is behind the requesting vehicle, or acting is effective. An assisting vehicle then responds with the requested alert or responds with a different alert. For instance, the assisting vehicle may respond with a different alert due to changing traffic conditions by honking a horn instead of flashing lights. Honking is more effective when the two vehicles are parallel or moving away from each other.

In various implementations, the assistance system uses manual verification by outputting a message to the assisting operator about taking action. For example, a human-machine interface (HMI) displays a message that another vehicle is requesting assistance in the form of flashing lights because an operator is drowsy. The assisting operator can approve the action for the assistance system to automatically perform the alerts. In one approach, the assisting operator approves the action and manually activates the alert requested, such as flashing lights.

Moreover, other vehicles besides the assisting vehicle can receive the assistance information through broadcasting. In one approach, the requesting vehicle targets requests to a subset of assisting vehicles according to license plate number or color. For example, the requesting vehicle uses image processing to capture the license plate numbers of assisting vehicles. In this way, the requesting vehicle selects assisting vehicles that can effectively improve the operator state by inferring traffic situations. Furthermore, by transmitting the assistance information to many vehicles, assisting vehicles can coordinate a response. For example, flashing lights from an assisting vehicle at 0 degrees (i.e., oncoming) is more effective than vehicles in cross-traffic positions at 90 degrees. Furthermore, using coordination the assisting vehicle at 0 degrees can flash lights while a vehicle in cross-traffic honks a horn. In this way, assisting vehicles improve the operator state by taking action upon request from a requesting vehicle, thereby increasing safety and DMS effectiveness.

Figure 1:
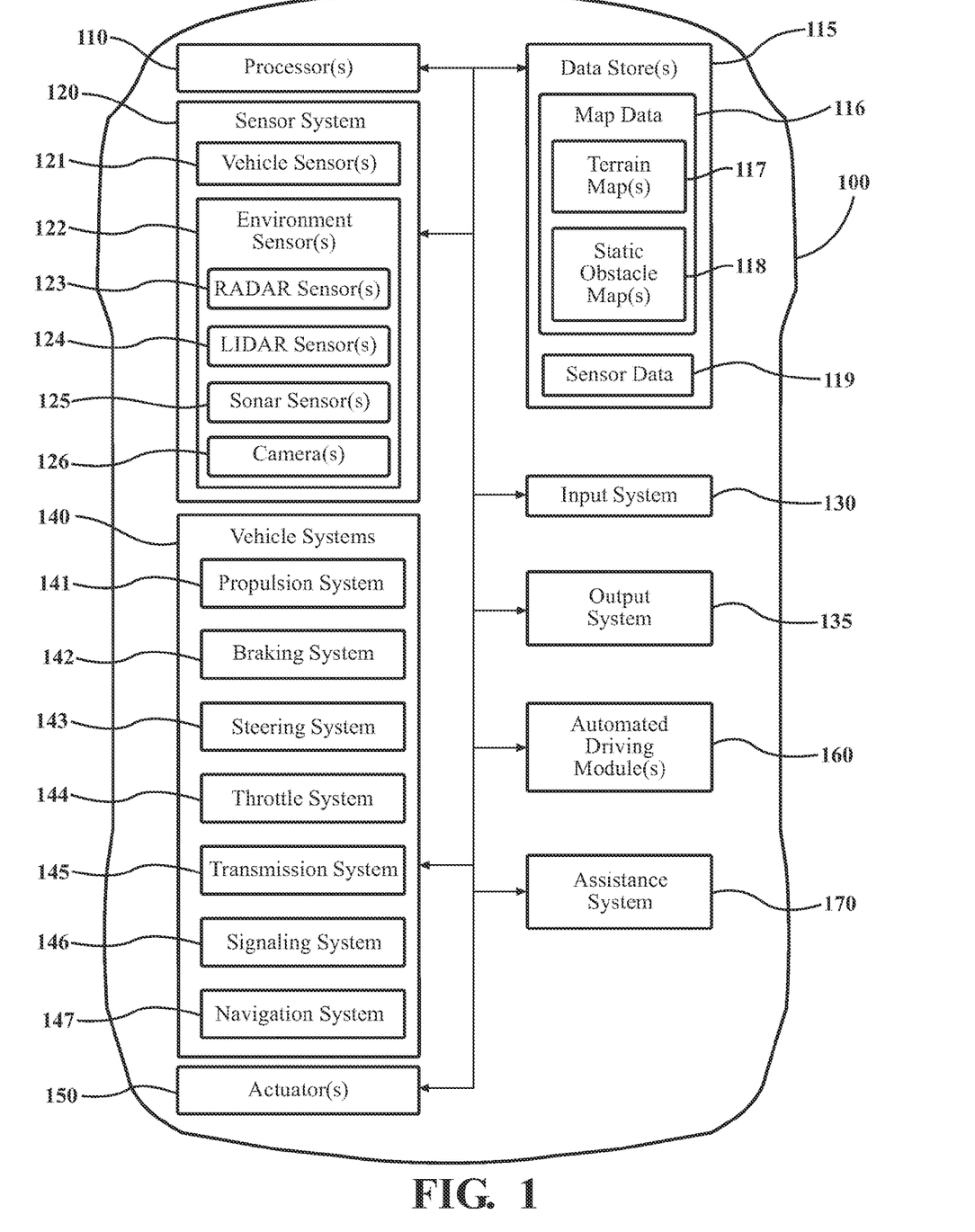
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that benefits from the functionality discussed herein associated with remotely assisting an operator that is impaired using alerts from a vehicle.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an assistance system 170 that is implemented to perform methods and other functions as disclosed herein relating to remotely assisting an operator that is impaired using alerts from a vehicle. Furthermore, in the forthcoming examples, operator state and the state of the operator may be interchangeable.

Figure 2:
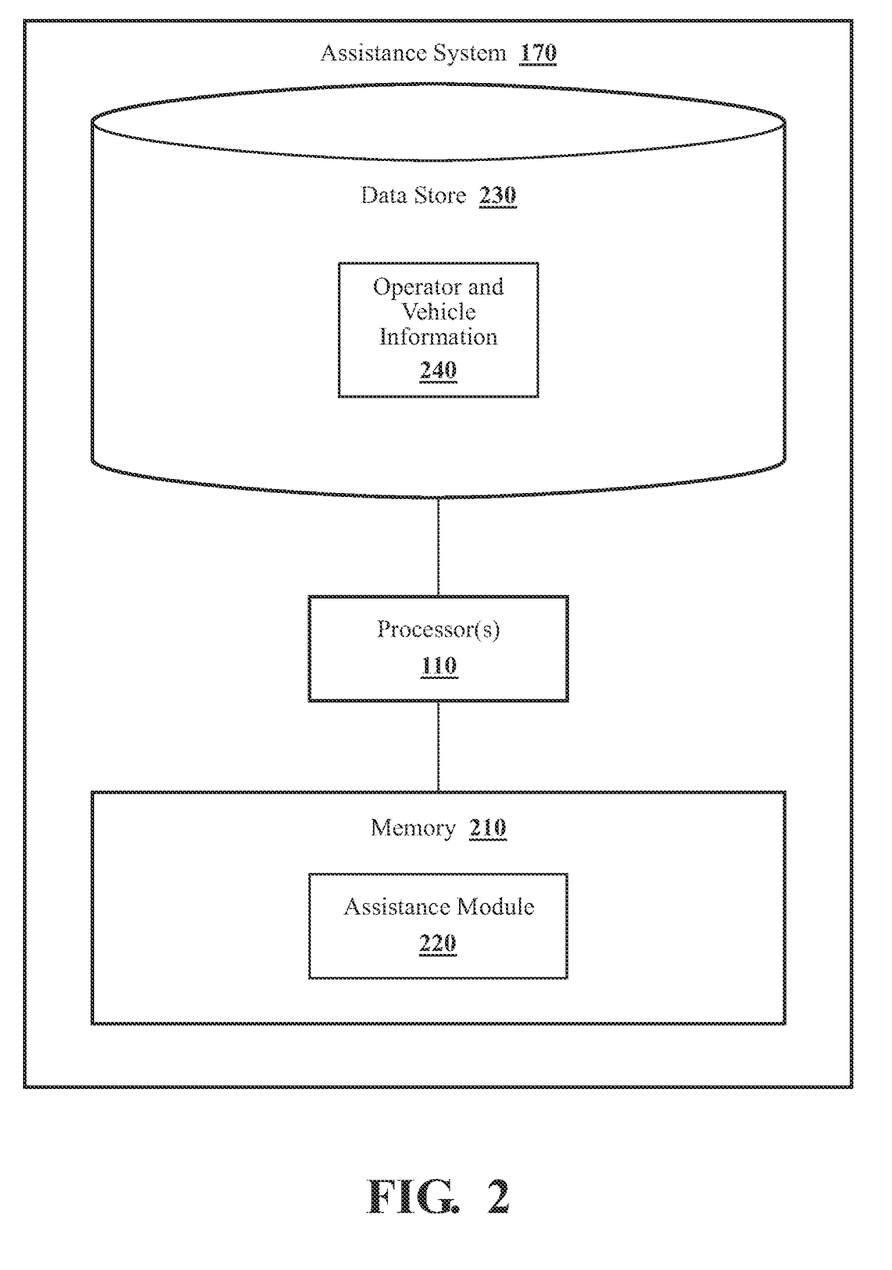
FIG. 2 illustrates one embodiment of an assistance system that is associated with remotely assisting an operator that is impaired using alerts from a vehicle.

Now referring to FIG. 2, one embodiment of the assistance system 170 of FIG. 1 is further illustrated. The assistance system 170 is shown as including a processor(s) 110 from the vehicle 100 of FIG. 1. Accordingly, the processor(s) 110 may be a part of the assistance system 170, the assistance system 170 may include a separate processor from the processor(s) 110 of the vehicle 100, or the assistance system 170 may access the processor(s) 110 through a data bus or another communication path. In one embodiment, the assistance system 170 includes a memory 210 that stores an assistance module 220. The memory 210 is a random-access memory (RAM), read-only memory (ROM), a hard-disk drive, a flash memory, or other suitable memory for storing the assistance module 220. The assistance module 220 is, for example, computer-readable instructions that when executed by the processor(s) 110 cause the processor(s) 110 to perform the various functions disclosed herein.

Moreover, the assistance module 220 generally includes instructions that function to control the processor(s) 110 to receive data inputs from one or more sensors of the vehicle 100. Moreover, in one embodiment, the assistance system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the assistance module 220 in executing various functions associated with assisting an operator remotely. In one embodiment, the data store 230 includes the operator and vehicle information 240 that specifies various characteristics associated with assistance information sent by a vehicle. For example, a vehicle needing help (e.g., ego vehicle) transmits assistance information wirelessly to an assisting vehicle (e.g., ado vehicle) that the operator is drowsy. The operator information can also include inattentive, unaware, and so on to indicate impairment. Such operator states may include a scale from 1-10, where a higher level indicates the severity of an impairment. In this way, assisting vehicles can use the scale to determine whether to act and customize alerts.

In one approach, a DMS in the requesting vehicle detects an operator state and/or determines scale using cameras, seat sensors, steering sensors, and so on. The DMS may send a request for assistance after attempts to change the operator state are unsuccessful. For example, the DMS causes an assistance system to broadcast assistance information when the operator remains drowsy after a number of haptic events on the steering wheel.

For the operator and vehicle information 240, the vehicle information can be a license plate number, global positioning system (GPS) information, location information, a speed, a vehicle identification number (VIN), a make, a model, and/or a color associated with the requesting vehicle. In various implementations, an ego vehicle broadcasts or communicates point-to-point data for the operator and vehicle information 240 using vehicle-to-infrastructure (V2I) or vehicle-to-vehicle (V2V) protocols. In this way, many assisting vehicles have the relevant assistance information to take action and assist the requesting vehicle. As explained below, assisting vehicles may also coordinate a response to increase effectiveness for improving the operator state.

Moreover, instructions included with the assistance module 220 cause the processor(s) 110 to receive, by an assisting vehicle from a vehicle requesting assistance, data for the operator and vehicle information 240 when the requesting vehicle is in proximity. In various implementations, the requesting vehicle is an ego vehicle and the assisting vehicle is an ado vehicle in automated modes, thereby automatically assisting operators in precarious states. An ego vehicle uses sensor data to perceive a traffic environment for applications such as automated driving. An ado vehicle may be near the ego vehicle and communicates sensor data to improve estimation of the traffic environment by the ego vehicle. For example, the ego vehicle shares a motion plan using camera data from an ado vehicle. The motion plan may be displayed by the ado vehicle to an operator for notifying a potential maneuver by the ego vehicle.

As explained below, the assisting vehicle may respond to the request and take action according to an approval procedure automatically or using manual feedback. For example, the assisting vehicle approves taking action to improve the operator state from drowsy to aware when in a head-on position with the requesting vehicle. The assisting vehicle then selects an alert for the action. The alert may be optimized for the position of the requesting vehicle and an environmental condition (e.g., darkness, daylight, rain, etc.) determined according to sensor data of the requesting vehicle.

Regarding optimization, the assistance system 170 can customize an alert when the operator and vehicle information 240 become stale or traffic conditions change. The selection includes the assistance system 170 factoring attributes or conditions of the surrounding environment. For example, noise levels in an urban environment can substantially diminish the effect of a honking horn. As such, the operator needing assistance ignores honking when noise levels in the environment are above a certain threshold. For example, the assistance system 170 determines the effectiveness of honking according to a relative distance (e.g., 20 meters) between the assisting and requesting vehicles.

To improve effectiveness, the vehicle 100 may be equipped with multiple and directional horns. These systems use horns in the back, left, or right of the vehicle 100 along with the front horn. In this way, the assistance system 170 uses position and density of surrounding traffic for customizing a horn as the alert using the multiple and directional horns, thereby improving warnings.

Now considering low-light (e.g., dusk or nighttime) conditions, the vehicle 100 uses lights to improve the operator state of the assisting vehicle. As such, the assisting vehicle leverages headlights, tail lights, and the brake light. The assistance system 170 can use lights as specified by the assistance information with customizations. For example, the assistance system 170 uses directional beams according to an angle of the vehicle 100 to the requesting vehicle. As such, the vehicle 100 at 0 degrees (i.e., oncoming or head-to-head) flashes narrow beams. If the vehicle 100 is coming around a curve at 45 degrees, the vehicle 100 flashes wider beams that can also be curved by levering motorized headlights.

Moreover, the assistance system 170 uses the brake light or tail lights to effectively improve the operator state. This configuration is directed to scenarios where the requesting vehicle is immediately behind the vehicle 100. Operators instinctually and automatically react to colored (e.g., red or yellow) brake or tail lights over other lights as they signal caution. For example, the assistance system 170 flashes the brake light with intensity when the operator is drowsy or impaired in the requesting vehicle and the vehicle 100 is immediately ahead or in a line-of-sight.

Figure 3:
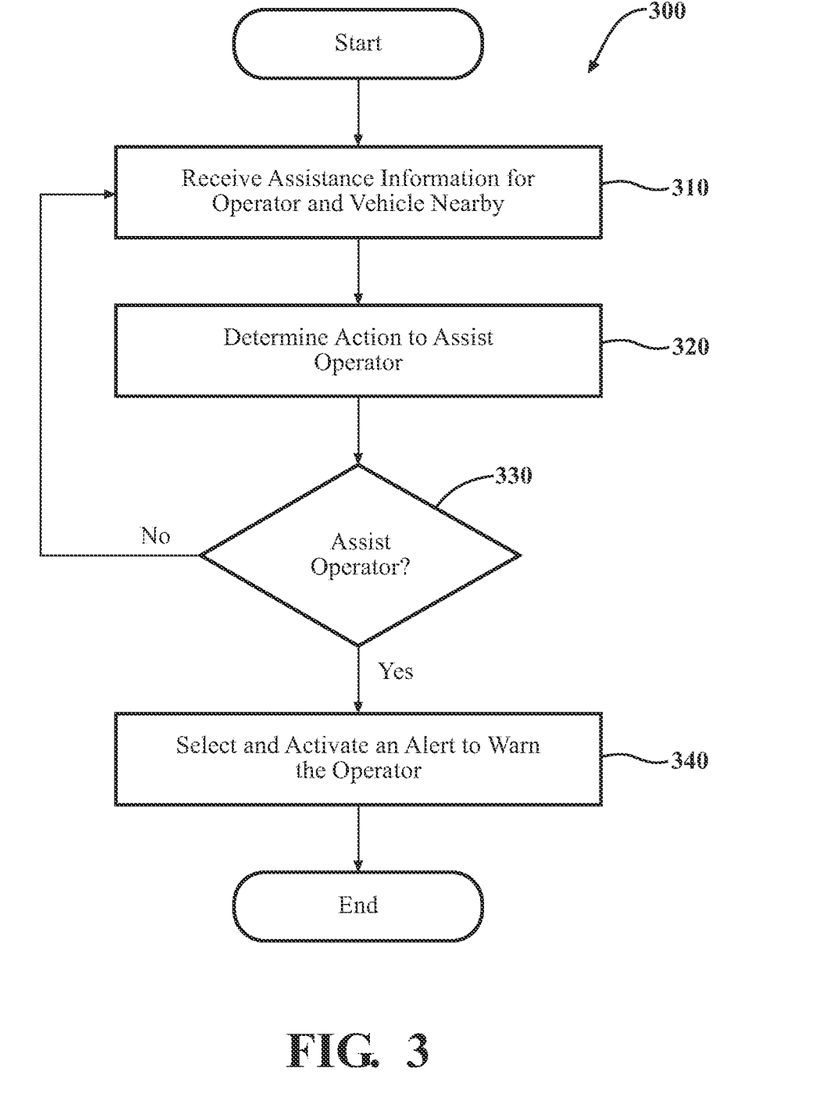
FIG. 3 illustrates one embodiment of a method that is associated with vehicles communicating to remotely assist an operator that is impaired using alerts.

Additional aspects of an assisting vehicle remotely aiding an operator of a requesting vehicle through alerts will be discussed in relation to FIG. 3. Here, the figure illustrates a flowchart of a method 300 that is associated with remotely assisting an operator that is impaired using alerts from the vehicle 100. Method 300 will be discussed from the perspective of the assistance system 170 of FIGS. 1 and 2. While method 300 is discussed in combination with the assistance system 170, it should be appreciated that the method 300 is not limited to being implemented within the assistance system 170 but is instead one example of a system that may implement the method 300. In various implementations, the operation in method 300 involves an assisting vehicle(s) receiving a request for assistance from a nearby vehicle.

In the forthcoming examples, the vehicle requesting assistance detects that the operator is drowsy, inattentive, unaware, or otherwise impaired. For example, the DMS in the vehicle uses data from a steering sensor to detect an operator state as drowsy. The requesting vehicle may also perform detection of the operator state by coordinating with an edge or cloud server processing the data. In response, assistance information from the requesting vehicle is transmitted and received by an assisting vehicle(s) with instructions to initiate a requested alert (e.g., flashing lights). An assisting vehicle then responds with the requested alert, responds with a different alert, or ignores the request. The assisting vehicle may determine whether to act and select one of various alerts according to relative position, speed, environmental conditions, and so on.

At 310, the assistance system 170 receives assistance information for an operator and a vehicle near an assisting vehicle(s). For example, the assistance information includes data for the operator and vehicle information 240 communicated using V2V protocols indicating that the operator is drowsy, inattentive, unaware, or otherwise impaired. The vehicle information can be a license plate number, GPS information, location information, a speed, a VIN, a make, a model, or a color. In various implementations, the vehicle 100 uses the vehicle information to preciously find the requesting vehicle through computer vision or other tasks. In addition, the assistance information also specifies the alert type such as flashing lights, honking horn, or initiate a call. In this way, the assisting vehicle has a recommendation from the requesting vehicle for alerts that can improve the operator state according to first-hand knowledge.

Furthermore, other assisting vehicles besides the vehicle 100 receive the assistance information through broadcast or point-to-point communications. In one approach, the requesting vehicle targets requests to a subset of assisting vehicles according to license plate number, location information, landmarks, and/or color. For example, the requesting vehicle uses image processing to capture the license plate numbers of assisting vehicles. In one approach, the vehicle then broadcasts the assistance information with the license plate numbers according to location information if the vehicle determines that the assisting vehicles can improve the operator state. For the point-to-point communications, the requesting vehicle can obtain the networking addresses (e.g., Internet Protocol (IP) address, medium access control (MAC) address) to contact nearby assisting vehicles from a server associated with a geographic area. The assistance information is then transmitted by the requesting vehicle using a point-to-point protocol with the networking addresses.

As a result of sending the assistance information to many vehicles, assisting vehicles can coordinate a response. For example, flashing lights from an assisting vehicle at 0 degrees (i.e., oncoming or head-to-head) is more effective than the same alert from vehicles in cross-traffic or parallel positions at 90 degrees. Furthermore, through coordination multiple responses are provided. For instance, the assisting vehicle at 0 degrees can flash lights while a vehicle in cross-traffic or traveling away from the requesting vehicle honks a horn. In this way, the effectiveness of the assistance is increased.

Moreover, an assisting vehicle coordinates by providing a notification with reasons for an alert and related details to other vehicles. For example, the assisting vehicle uses V2I to notify a server that they are flashing lights for the next 20 seconds because a red sedan traveling on Main and State street has an inattentive operator. The server notifies vehicles ahead of the assisting vehicle the reason for the flashing lights. Similarly, vehicles cross-traffic and near the crosswalk are notified by the server to prevent confusion that the flashing lights are directed at them. In another example, the assisting vehicle displays a text on a windshield explaining the reason for the alert. In this way, the vehicles or other operators can ignore the alert. In one approach, other vehicles use the notification to generate additional alerts in response to the original request.

Coordination may also involve forming a consensus among assisting vehicles. For example, the assistance system 170 notifies other vehicles that honking the horn will assist an operator driving under the influence that is drifting off the road to track the lane. However, a majority of the other vehicles suggest that calling the requesting vehicle through an audio connection is more effective at improving the operator state for this scenario. Calling the vehicle may also be safer than honking for the current traffic scenario. Accordingly, a consensus is reached for the primary assisting vehicle to initiate a call among all the assisting vehicles. In one approach, the operator of the vehicle 100 can also participate by adding or overruling the consensus. In this way, a human in the loop ensures that taking action by the assisting vehicle is effective and safe.

In various implementations, the requesting vehicle attempts to change the operator state prior to sending the assistance information. For example, the vehicle sends the assistance information after vibrating the steering wheel and sounding an alarm fail to make a drowsy operator more aware. The vehicle can also perform a number of attempts or use a countdown timer prior to requesting assistance from nearby vehicles.

Returning to the method 300, at 320 the assistance system 170 determines an action or assistance for the operator. Here, the assistance system 170 can use vehicle information such as speed, position, color, etc. to determine that the vehicle 100 should respond and use the alert type (e.g., flash lights for ten seconds). The assistance system 170 can also determine that an action different than the one requested is more effective at assisting the operator. In one approach, the assistance system 170 calculates an angle, distance, or geometric parameter relative to the requesting vehicle using the last position and color from image processing for precise positioning at 320. For instance, the system calculates a geometric circle having the requesting vehicle at the origin and the assisting vehicle is a vector. At 0 degrees, the assisting vehicle is located head-to-head. A vector to the assisting vehicle also identifies the distance between the two vehicles. As such, a vector at 45 degrees and beyond a distance threshold (e.g., 20 meters) may identify a scenario where flashing lights and honking of the horn is most effective.

Moreover, attributes such as environmental conditions can also be a factor in taking action. For example, flashing lights are ineffective during a snowstorm in the morning due to visibility levels. This is especially the case when the vehicle 100 is behind the requesting vehicle. Regarding manual feedback, the assistance system 170 can output a message to the assisting operator of the vehicle 100 for input about taking action as verification. For example, an HMI or head unit displays a message that a vehicle is requesting assistance in the form of flashing lights because the other operator is drowsy. In addition, as described above, operations similar to that given for assistance system 170 at 320 can be performed by the vehicle requesting assistance or a local server remotely.

At 330, the assistance system 170 assists the operator in the requesting vehicle upon approval. For example, the assistance system 170 ignores the request if the vehicle 100 is unable to follow the action requested, improve the operator state, or already preoccupied with another task. The assistance system 170 approves taking action if the angle of the vector described above is within a range (e.g., less than 90 degrees), the vehicle 100 is in front/behind the requesting vehicle, or acting is likely effective. As part of the process, the assisting operator can approve taking automatic action by the assistance system 170 and manually performing the alerts (e.g., flashing lights or honking the horn). If the request is denied, the assistance system 170 acquires further assistance information.

Upon the approval, at 340 the assistance system 170 selects and activates through actuators 150 an alert that remotely warns the operator in the requesting vehicle. In various implementations, the selected alert is the alert specified in the assistance information by the requesting vehicle. In this way, the requesting vehicle selects the optimal alert for improving the operator state. For example, the requesting vehicle determines that a honk by a vehicle in a cross-traffic position (e.g., 90 degree position) approaching from the driver side is more effective than flashing lights by an oncoming vehicle.

Moreover, the assistance system 170 can select and customize an alert instead of using the specified alert. This may be needed when the operator and vehicle information 240 become stale or traffic conditions change. The selection includes the assistance system 170 factoring environmental conditions. For example, noise levels in an urban environment can substantially diminish the effect of a honking horn. The operator needing assistance is also more likely to ignore honking when noise levels in the environment are above a certain threshold. As such, the assistance system 170 determines the effectiveness of honking according to a relative distance (e.g., 20 meters) between the assisting and requesting vehicles.

In various implementations, the vehicle 100 is equipped with multiple or directional horns. These systems use horns in the back, left, or right of the vehicle 100 along with the front horn. In this way, the assistance system 170 uses position and density of surrounding traffic for customizing a horn as the alert using the multiple or directional horns, thereby improving effectiveness.

Now turning to low-light conditions, the vehicle 100 uses lights to improve the operator state of the assisting vehicle. This includes headlights, tail lights, the brake light, and sidelights. The assistance system 170 can use lights as specified by the assistance information with customizations. For example, the assistance system 170 uses shaped or directional beams according to an angle of the vehicle 100 to the requesting vehicle. For example, the vehicle 100 at 0 degrees (i.e., oncoming or head-to-head) flashes narrow beams that are slightly tilted. If the vehicle 100 is coming around a curve at 25 degrees, the vehicle 100 flashes wider, curved beams. In addition, the vehicle makes light intensity higher in less dense traffic.

The assistance system 170 can also use the brake light or tail lights to effectively improve the operator state when the requesting vehicle is immediately behind the vehicle 100. Certain operators automatically react to brake or tail lights as they signal caution. For example, the brake light is flashed with intensity when the operator is drowsy or impaired in the requesting vehicle and the vehicle 100 is immediately ahead or in an adjacent lane.

For safety, the assistance system 170 selects and customizes alerts to prevent disturbance to the operation of the vehicle 100 and surrounding traffic. As such, the assistance system 170 selects low beams, regular honks, or displays text on the windshield for the alert in denser traffic. As another example, the assistance system 170 disables alerts when an emergency vehicle is approaching for safety reasons. In addition, the assistance system 170 initiates for safety an audio connection for a call to the requesting vehicle instead of honking that can startle operators. A call is also effective when other vehicles are unavailable to assist the operator and other alerts will not help due to distance or noise levels.

Figure 4:
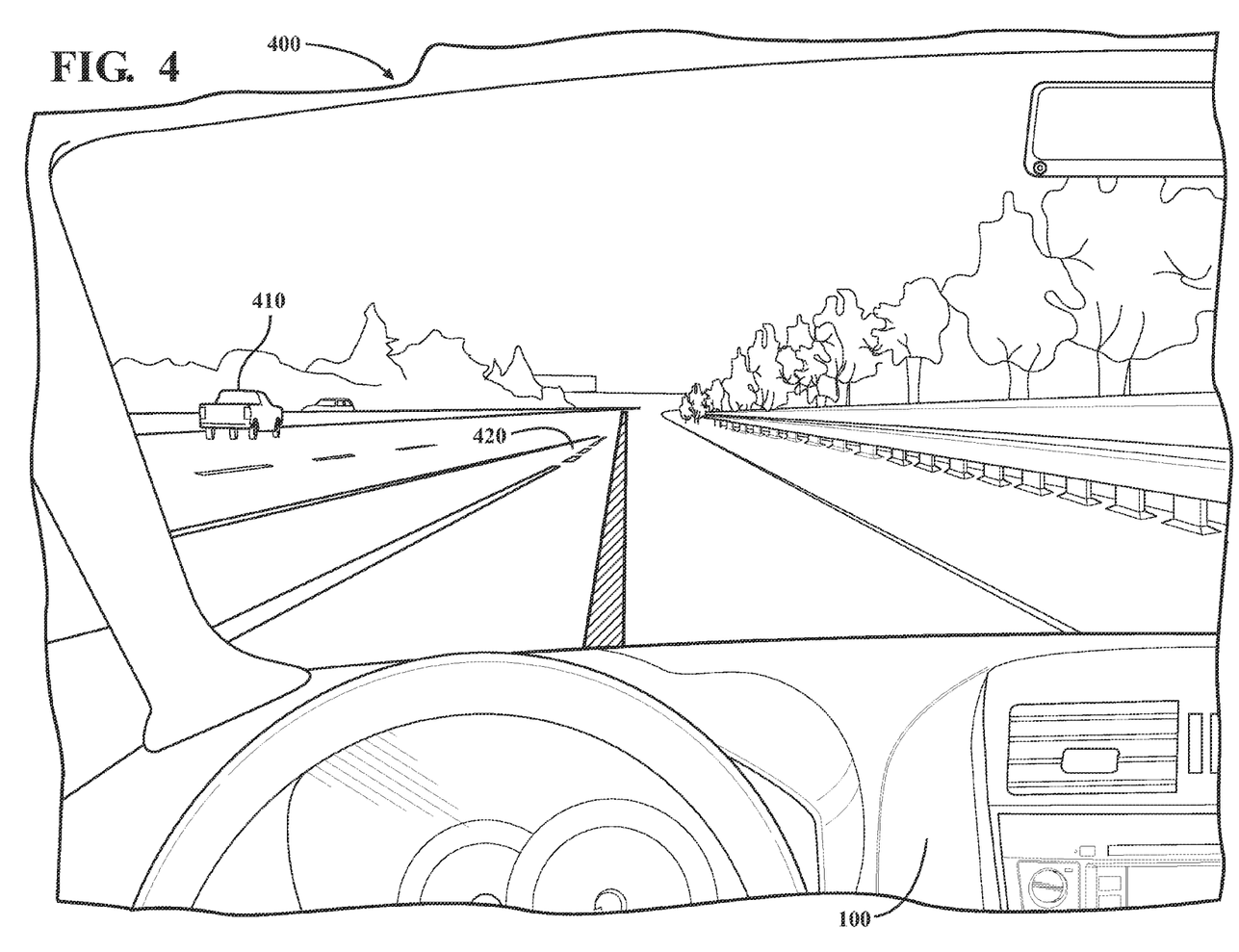
FIG. 4 illustrates a vehicle environment where vehicles coordinate to assist an impaired operator using alerts remotely.

Turning now to FIG. 4, the figure illustrates a vehicle environment 400 where vehicles coordinate to assist an impaired operator by using alerts remotely. The vehicle 100 may receive assistance information from the requesting vehicle 410 when merging onto lane 420. For example, the assistance information is data for the operator and vehicle information 240 communicated using V2V protocols. The information indicates that the operator is drowsy, inattentive, unaware, or otherwise impaired. The vehicle information can be a license plate number, GPS information, location information, a speed, a VIN, a make, a model, or a color. In various implementations, the vehicle 100 finds the requesting vehicle 410 through computer vision or other tasks with this information. In addition, the assistance information also specifies the alert type such as flashing lights, honking horn, or initiating a call.

In one approach, a DMS in the requesting vehicle 410 detects the operator state and/or scale using cameras, seat sensors, steering sensors, and so on. The DMS may send a request for assistance after attempts to change the operator state are unsuccessful. For example, the DMS causes an assistance system to broadcast the assistance information when the operator remains drowsy after a number of haptic events on the steering wheel.

In response to receiving the assistance information from the requesting vehicle 410, the vehicle 100 determines whether to take action. The assistance system 170 can approve taking action automatically or requests feedback from the operator of the vehicle 100. For example, the assisting vehicle determines whether to act and select one of various alerts according to relative position, speed, environmental conditions, and so on. If approved, the vehicle 100 responds with the requested alert (e.g., flashing lights or responds with a different alert).

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), and an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a GPS, a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the assistance system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140 and, thus, may be partially or fully autonomous as defined by the society of automotive engineers (SAE) levels 0 to 5.

The processor(s) 110 and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110 and/or the automated driving module(s) 160 can control the direction and/or speed of the vehicle 100. The processor(s) 110 and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to determine travel path(s), current autonomous driving maneuvers for the vehicle 100, future autonomous driving maneuvers, and/or modifications to current autonomous driving maneuvers based on data acquired by the sensor system 120, driving scene models, and/or data from any other suitable source such as determinations from sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of ... and ...." as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An assistance system for assisting an operator remotely, comprising:

a processor; and a memory storing instructions that, when executed by the processor, cause the processor to:

receive, by a first vehicle using a communications network, assistance information about the operator and a second vehicle near the first vehicle, wherein the assistance information indicates a state of the operator and a position of the second vehicle;

upon approving action according to the state and the position, select an alert from multiple alerts that changes the state according to the position, an alignment between the first vehicle and the second vehicle, and attributes associated with driving conditions derived from sensor data of the first vehicle; and activate the alert by the first vehicle.

2. The assistance system of claim 1, wherein the instructions to select the alert further include instructions to determine an angle between the first vehicle and the second vehicle in relation to the position, and wherein the alert uses lights of the first vehicle to change the state of the operator when the angle is within a range and the attributes satisfy a visibility level.

3. The assistance system of claim 1, further including instructions to:

determine whether the second vehicle is in front of the first vehicle according to vehicle information included with the assistance information; and initiate, by the first vehicle, a horn for the alert when the second vehicle is in the front of the first vehicle and the attributes satisfy a noise level.

4. The assistance system of claim 1, further including instructions to coordinate, by the first vehicle, a response with other vehicles according to a geometry, a distance, and a speed between the second vehicle and the other vehicles.

5. The assistance system of claim 1, wherein the instructions to select the alert further include instructions to initiate a call to the second vehicle when other vehicles are unavailable to assist the operator and the first vehicle satisfies a threshold for distance to change the state of the operator.

6. The assistance system of claim 1, further including instructions to notify, by the first vehicle, vehicles in proximity to the first vehicle a reason for the alert.

7. The assistance system of claim 1, further including instructions to determine, by the first vehicle or the second vehicle, the state of the operator using sensor information of the second vehicle included in the assistance information.

8. The assistance system of claim 7, wherein the state of the operator is one of drowsy, inattentive, unaware, and impaired and the second vehicle indicates the alert in the assistance information.

9. The assistance system of claim 1, wherein the first vehicle receives the assistance information responsive to the second vehicle warning the operator of a dangerous condition.

10. A non-transitory computer-readable medium for assisting an operator remotely comprising:

instructions that when executed by a processor cause the processor to:

receive, by a first vehicle using a communications network, assistance information about the operator and a second vehicle near the first vehicle, wherein the assistance information indicates a state of the operator and a position of the second vehicle;

upon approving action according to the state and the position, select an alert from multiple alerts that changes the state according to the position, an alignment between the first vehicle and the second vehicle, and attributes associated with driving conditions derived from sensor data of the first vehicle; and activate the alert by the first vehicle.

11. The non-transitory computer-readable medium of claim 10, wherein the instructions to select the alert further include instructions to determine an angle between the first vehicle and the second vehicle in relation to the position, and wherein the alert uses lights of the first vehicle to change the state of the operator when the angle is within a range and the attributes satisfy a visibility level.

12. A method, comprising:

receiving, by a first vehicle using a communications network, assistance information about an operator and a second vehicle near the first vehicle, wherein the assistance information indicates a state of the operator and a position of the second vehicle;

upon approving action according to the state and the position, selecting an alert from multiple alerts that changes the state according to the position, an alignment between the first vehicle and the second vehicle, and attributes associated with driving conditions derived from sensor data of the first vehicle; and activating the alert by the first vehicle.

13. The method of claim 12, wherein selecting the alert further includes determining an angle between the first vehicle and the second vehicle in relation to the position, and wherein the alert uses lights of the first vehicle to change the state of the operator when the angle is within a range and the attributes satisfy a visibility level.

14. The method of claim 12, further comprising:

determining whether the second vehicle is in front of the first vehicle according to vehicle information included with the assistance information; and initiating, by the first vehicle, a horn for the alert when the second vehicle is in the front of the first vehicle and the attributes satisfy a noise level.

15. The method of claim 12, further comprising:

coordinating, by the first vehicle, a response with other vehicles according to a geometry, a distance, and a speed between the second vehicle and the other vehicles.

16. The method of claim 12, wherein selecting the alert further includes initiating a call to the second vehicle when other vehicles are unavailable to assist the operator and the first vehicle satisfies a threshold for distance to change the state of the operator.

17. The method of claim 12, further comprising:

notifying, by the first vehicle, vehicles in proximity to the first vehicle about a reason for the alert.

18. The method of claim 12, further comprising:

determining, by the first vehicle or the second vehicle, the state of the operator using sensor information of the second vehicle included in the assistance information.

19. The method of claim 18, wherein the state of the operator is one of drowsy, inattentive, unaware, and impaired and the second vehicle indicates the alert in the assistance information.

20. The method of claim 12, wherein the first vehicle receives the assistance information responsive to the second vehicle warning the operator of a dangerous condition.

* * * * *

UNITED STATES PATENT AND TRADEMARK OFFICE
CERTIFICATE OF CORRECTION

| | |
|---|---|
| PATENT NO. | : 11,767,021 B2 |
| APPLICATION NO. | : 17/475980 |
| DATED | : September 26, 2023 |
| INVENTOR(S) | : Yasuda et al. |

It is certified that error appears in the above-identified patent and that said Letters Patent is hereby corrected as shown below:

In the Specification

Column 1, Line 66: replace "The assistances system" with --The assistance system--.

Column 2, Line 28: replace "In one embodimnt, a method of remtely" with --In one embodiment, a method of remotely--.

Signed and Sealed this
Seventh Day of November, 2023

Katherine Kelly Vidal
*Director of the United States Patent and Trademark Office*